A. RISPEL.
BACON HOOK.
APPLICATION FILED OCT. 1, 1910.
1,006,007.
Patented Oct. 17, 1911.
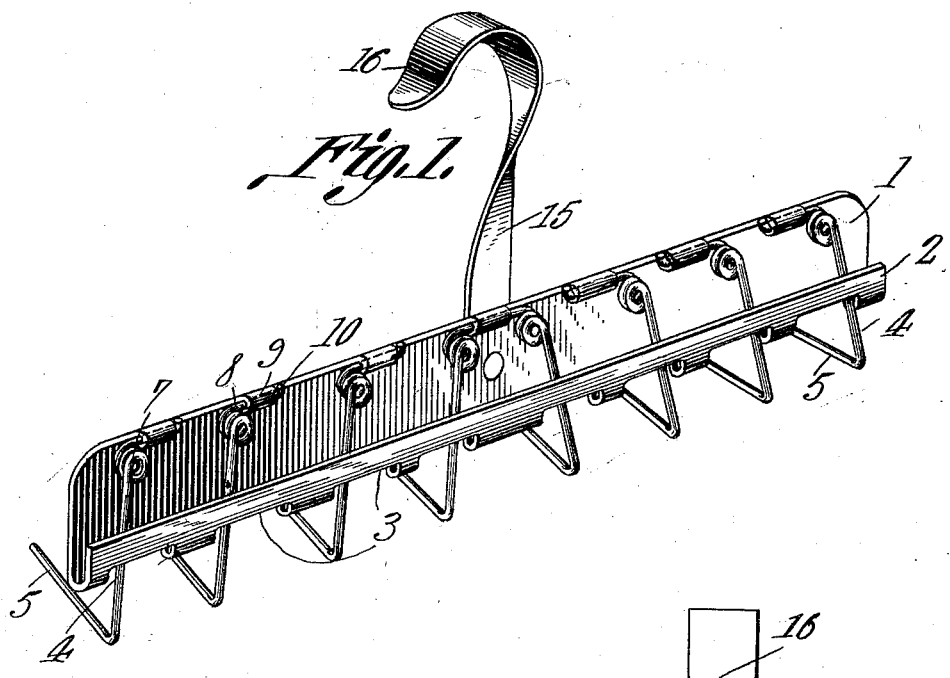
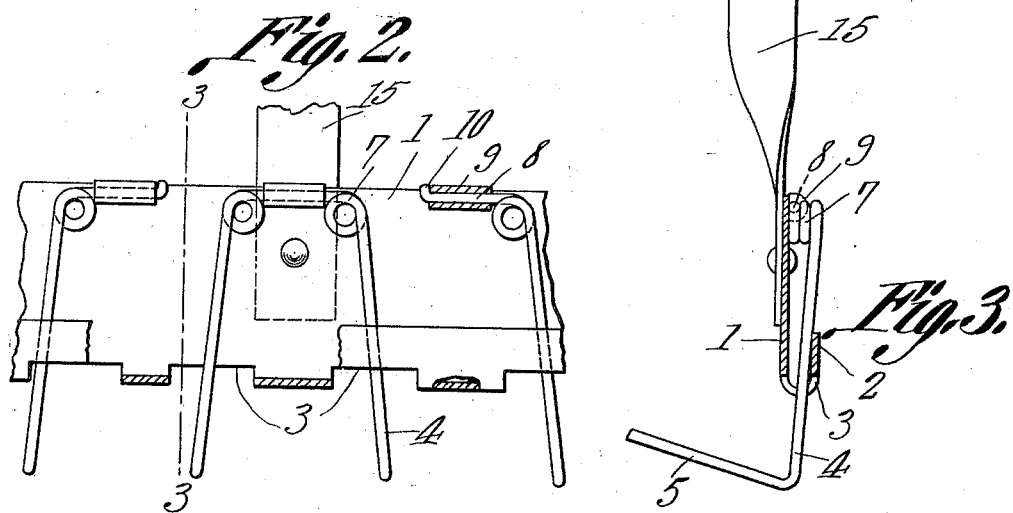
Witnesses
Alexander Rispel
Inventor
by C. A. Snow & Co.
Attorneys

UNITED STATES PATENT OFFICE.

ALEXANDER RISPEL, OF CHICAGO, ILLINOIS.

BACON-HOOK.

1,006,007. Specification of Letters Patent. Patented Oct. 17, 1911.

Application filed October 1, 1910. Serial No. 584,886.

*To all whom it may concern:*

Be it known that I, ALEXANDER RISPEL, a citizen of the United States, residing at Chicago, in the county of Cook and State of Illinois, have invented a new and useful Bacon-Hook, of which the following is a specification.

This invention belongs to the art of hooks and hangers for the purpose of supporting various meats, and the object of the invention is to provide a device of this design in which there is involved various novel features of construction.

The invention comprises a novel structure embodying an elongated plate having its lower longitudinal edge folded upon itself and provided with openings where the plate is folded, and through which openings the shanks of the various hooks extend, said hooks having coils in their upper portions, by which resiliency is afforded for the hooks. The shanks terminate at their lower portions in hooks upon which the bacon or meat may be supported. The shanks beyond the coils terminate in right angled feet which are anchored in rolls formed integral with the plate, there being upturned ends formed at the extremities of these feet to engage the ends of said rolls, in order to insure security for the shanks of the hooks. The plate is provided with an upwardly projecting hook, whereby the whole may be suspended from any suitable object or structure.

Another object of the invention is to provide a hanger having twin hooks, whereby various meats may be suspended in a smoke house, or any other place, in which it may be desired to hang the meat for the purpose of various treatments. It is a known fact that bacon shrinks when suspended from hooks, and to permit of this shrinking the various hooks are permitted to have sliding movements toward one another.

In the drawings, however, there is only disclosed one particular form of the invention, but in practical fields this form may necessitate alterations to which the applicant is entitled, provided the alterations are comprehended by the appended claims.

In the drawings: Figure 1 is a perspective view of the hanger. Fig. 2 is a view partly in elevation and partly in section. Fig. 3 is a sectional view on line 3—3 of Fig. 2.

Referring to the drawings, 1 designates an elongated plate, the lower longitudinal portion of which is folded upon itself, as indicated at 2, as shown in Fig. 3. The fold is provided with a series of elongated openings 3. Extending through these openings are the shanks 4 of the hooks, whose bills 5 extend laterally of the shanks. These bills do not extend exactly at right angles to the shanks, but stand a little above right angles as shown in Fig. 3.

The shanks 4 at their upper portions are formed into coils 7 as shown in Fig. 1, and the feet portions 8 of the shanks beyond the coils are disposed laterally of the shanks, and are mounted in the eyes of rolls 9 formed from lugs which are integral with the elongated plate. The plate when stamped is provided with the openings and the lugs at one stamping. The tips of the feet 8 are turned upwardly as shown at 10 adjacent the ends of the rolls, the rolls being positioned between the tips and the coils in order to secure the shanks rigidly in position. However, the coils afford resiliency for the shanks, in order to permit them to yield when bacon is being treated upon these hooks, it being a known fact that the bacon shrinks when suspended in a smoke house. The elongated plate has riveted to it a sheet metal bar 15, which is turned into a hook 16 whereby the elongated plate with its various hooks may be suspended from any suitable structure or object.

The twin hooks shown at the center of Figs. 1 and 2 are constructed and mounted exactly like those above described, excepting the feet 8 of two adjacent hooks are merged into each other integrally and extended into one of the intervening rolls. When a piece of bacon is hung upon the bills of these twin hooks they are at first somewhat spread apart, but as the bacon dries and shrinks their coils permit the bills to approach each other so that the meat is not torn.

From the foregoing taken in connection with the annexed drawings, it will be observed that a novel and efficient hanger is produced, and one which may be manufactured very cheaply and supplied to the trade at a reasonable cost. It has been realized through practical demonstrations with this hanger that it efficiently and practically fills the bill as a useful hanger.

The invention having been set forth, what is claimed as new and useful is:

1. A bacon hook comprising an elongated plate having its lower longitudinal portion folded upon itself and including openings in the folded portion, and yieldable hook shanks carried by the plate and movable in the openings.

2. A bacon hook comprising an elongated plate having near its lower edge a plurality of longitudinally elongated openings, and yieldable hook shanks carried by the upper edge of the plate and extending through the openings.

3. A bacon hook comprising a plate having its lower portion folded upon itself and provided with openings in the folded portion, hooks having yieldable shanks extending through the openings, and means for anchoring the shanks to the plate.

4. A bacon hook comprising a plate having its lower portion folded upon itself and provided with openings in the folded portion, hooks having yieldable shanks extending through the openings, said plate including rolls to receive the shanks beyond their yieldable portions.

5. A bacon hook comprising a plate having openings in its lower portion, hooks having yieldable shanks arranged and movable in the openings, and having their upper portions turned into coils, said plate having at its upper portion rolls to receive the shanks beyond the coils.

6. A bacon hook comprising a plate standing on edge with its lower portion folded upon itself and provided with longitudinal openings, rolls formed along the upper portion of said plate and having longitudinally disposed eyes through them, and a series of hooks each having an upright shank passing loosely through one of said openings, a bill at the lower end of the shank, a yielding element at the upper end of said shank, and a laterally projecting foot beyond said element passing through the eye of one of said rolls.

7. A bacon hook comprising a plate standing on edge and provided with longitudinal openings, rolls formed along the upper portion of said plate and having eyes through them, and a series of hooks each having an upright shank passing loosely through one of said openings, a bill at the lower end of the shank and standing at an acute angle to it, a coil at the upper end of said shank, and a laterally projecting foot beyond said coil passing through the eye of one of said rolls.

8. A bacon hook comprising an upright plate having its lower portion folded upon itself and provided with a plurality of openings in the fold, said openings standing in alinement with each other, a roll at the upper edge of the plate, means for supporting the plate, and a twin hook consisting of nearly parallel shanks, each projecting through one of said openings and having a bill extending at an angle from its lower extremity, the upper ends of said shanks being continued into spring coils connected by an integral bar forming a foot for each hook, the whole for use substantially as described.

In testimony that I claim the foregoing as my own, I have hereto affixed my signature in the presence of two witnesses.

ALEXANDER RISPEL.

Witnesses:
LOUIS LIEDTKE,
R. H. BRUNKHORST.